June 9, 1925.
H. C. KAETKER
SWING SAW
Filed Sept. 5, 1922
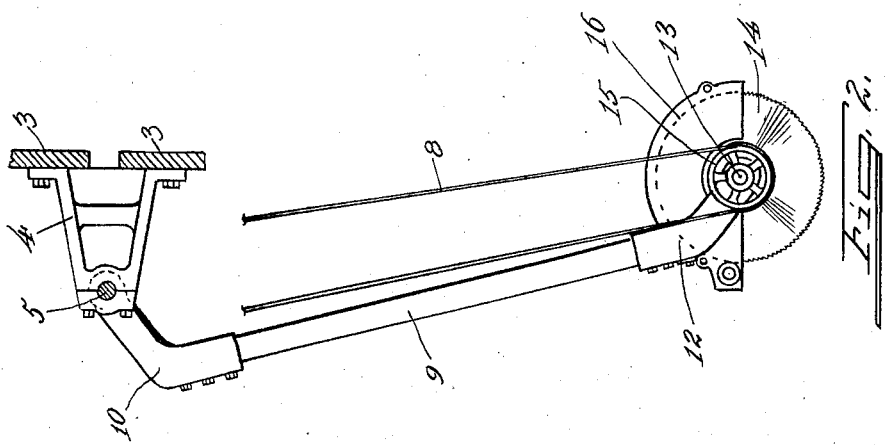
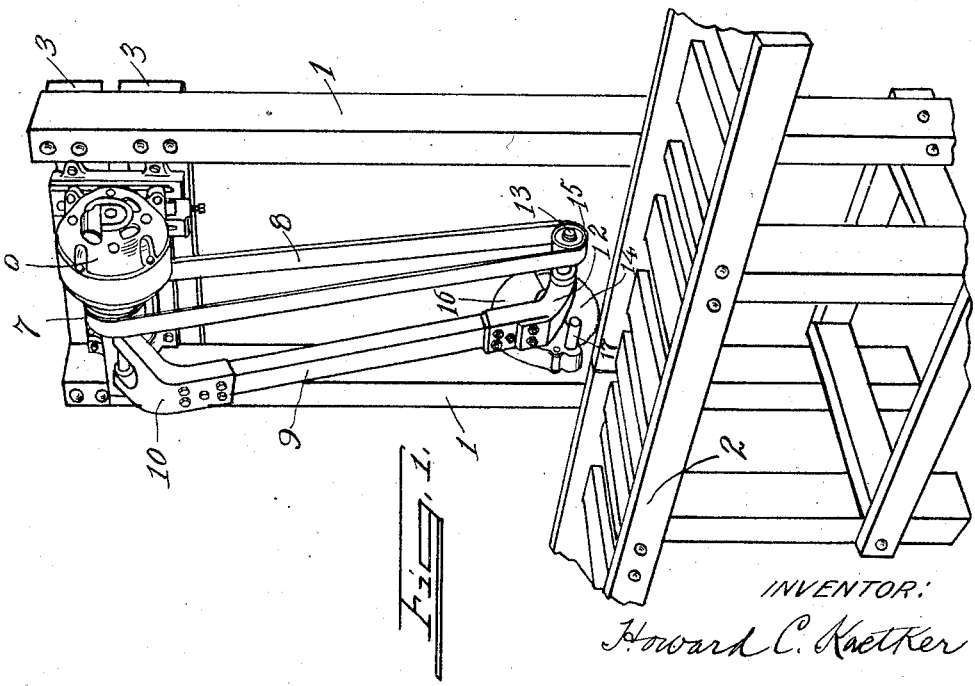
INVENTOR:
Howard C. Kaetker
BY
Allen & Allen
ATTORNEYS.

Patented June 9, 1925.

1,540,842

UNITED STATES PATENT OFFICE.

HOWARD C. KAETKER, OF CINCINNATI, OHIO, ASSIGNOR TO ELIZABETH TOWSLEY, OF CINCINNATI, OHIO.

SWING SAW.

Application filed September 5, 1922. Serial No. 586,152.

*To all whom it may concern:*

Be it known that I, HOWARD C. KAETKER, a citizen of the United States, and a resident of Cincinnati, in the county of Hamilton and State of Ohio, have invented certain new and useful Improvements in Swing Saws, of which the following is a full, clear, and exact description, reference being had to the accompanying drawings, forming part of this specification.

My invention relates to devices for supporting disk saws which are driven by power, usually an electric motor, and are designed to carry the saw so that it can be swung over the work by the operator.

Heretofore it has been customary to counterbalance the swinging arm or to apply spring tension to the arm, so that when not in use the saw shall be swung away from the operator and the operating table. When the electric motor is mounted so as to serve as a counterweight, the driving belt from the motor to the saw spindle must necessarily pass forwardly of the swing arm and the operator is liable to come in contact with the belt and in addition to this all arrangements for counterbalancing the arm or for springs require extra castings and fittings which add to the expense of construction.

It is the object of my invention to provide a construction of swing arm in which there shall be no need of a counterweight, nor necessity of carrying the driving belt in front of the arm, nor for the use of springs, and in which the construction of the arm itself and the method of mounting shall normally cause the saw when not in use or when released by the operator to swing away from the table.

In the drawings,

Figure 1 is a perspective view of the swing arm and saw table embodying my invention.

Figure 2 is a side elevation of the arm.

I have illustrated the device as supported on the upper end of standards 1, 1, extending upwardly at the rear side of the saw table 2.

Cross pieces 3, 3, form a wall or cross support to which are bolted or otherwise suitably secured, forwardly extending brackets 4 in which is journaled the shaft 5 for supporting the swing arm. The electric motor 6 is mounted on the pieces 3, 3, and operates the driving pulley 7 for the belt 8 for rotating the saw. Where the shaft of the motor is set out of line with shaft 5 an increased tension may be obtained upon movement of the arm.

Pivotally mounted on the shaft 5 is the swing arm for the saw. This swing arm comprises a straight bar 9 with rearwardly curved or angled castings 10, 12. The upper end of the casting 10 is pivoted on the shaft 5 and the lower end of the casting 12 carries the spindle 13, upon one end of which the disk saw 14 is mounted, while the spindle 13 also carries the pulley 15 over which the belt 8 runs to rotate the saw. Instead of the pulley 15 and spindle 13, an electric motor could be used for the pulley and its shaft would serve as the spindle.

There is also attached to the side of the casting 12 a shield or cover 16 for the saw, and projecting laterally from the front of the cover is the handle 17 by which the operator draws the saw to the work. The upper connecting piece 10 forms a forwardly projecting elbow, so that the center of gravity of the swing arm structure is thrown a substantial distance to the rear of a vertical line from the supporting shaft 5 and therefore the saw, when released, will be carried to the rear of the table out of danger to the operator. This elbow also brings the swing arm in front of the driving belt, so that there is no liability of accidental contact with the belt when running. While I have illustrated the swing arm as constructed of three pieces, of course the entire arm may be integral, nor is the frame and support for the swing arm an essential feature, as it will be evident that the parts may be mounted on the wall of the factory or at any other convenient place.

Having thus described my invention, what I claim as new and desire to secure by Letters Patent, is:—

1. In a swing saw, the combination with a swing arm, means for supporting same at its upper end, a cutting element mounted in the lower end, said arm having a bend near its upper end projecting away from the vertical plane of the support to throw the lower end carrying the saw away from the operator.

2. In a swing saw, the combination with a supporting bracket and shaft journaled thereon, of a swing arm pivoted to the shaft, a cutting element mounted in the lower end thereof, with said swing arm having a bend both at its upper and lower ends, both bends projecting forwardly, whereby the cutting element will normally hang inwardly a substantial distance from the vertical.

HOWARD C. KAETKER.